April 2, 1935.  G. TREMOLADA  1,996,311
COMBINATION FLEXIBLE COUPLING AND TORQUE CONTROL
Filed Feb. 3, 1933   3 Sheets-Sheet 1
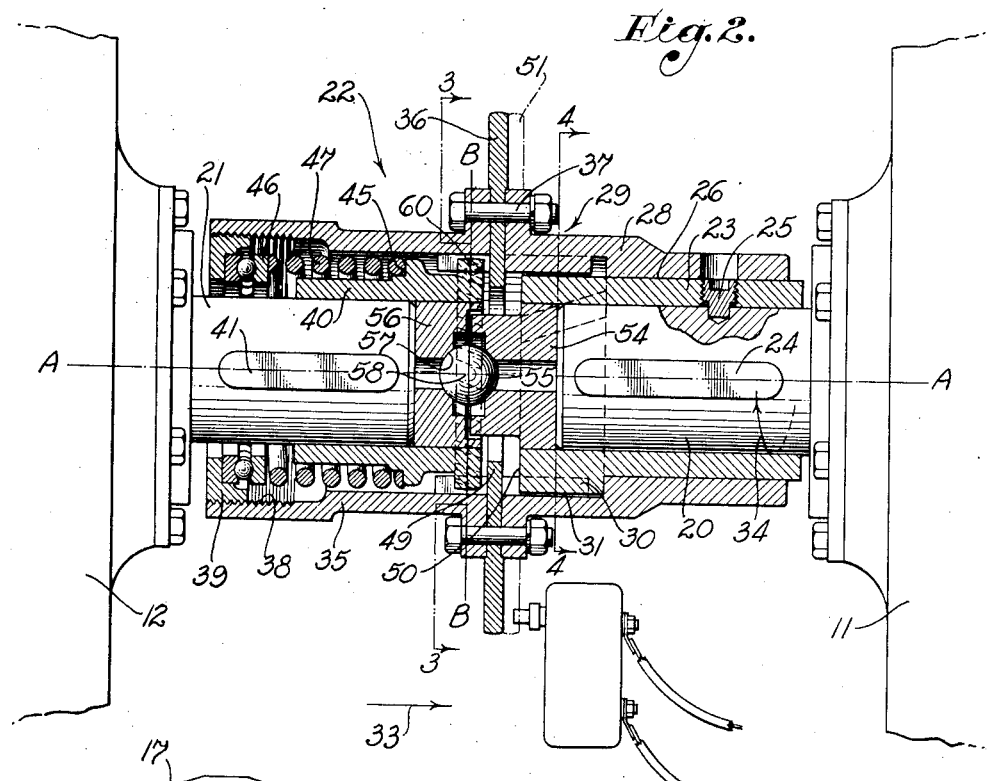
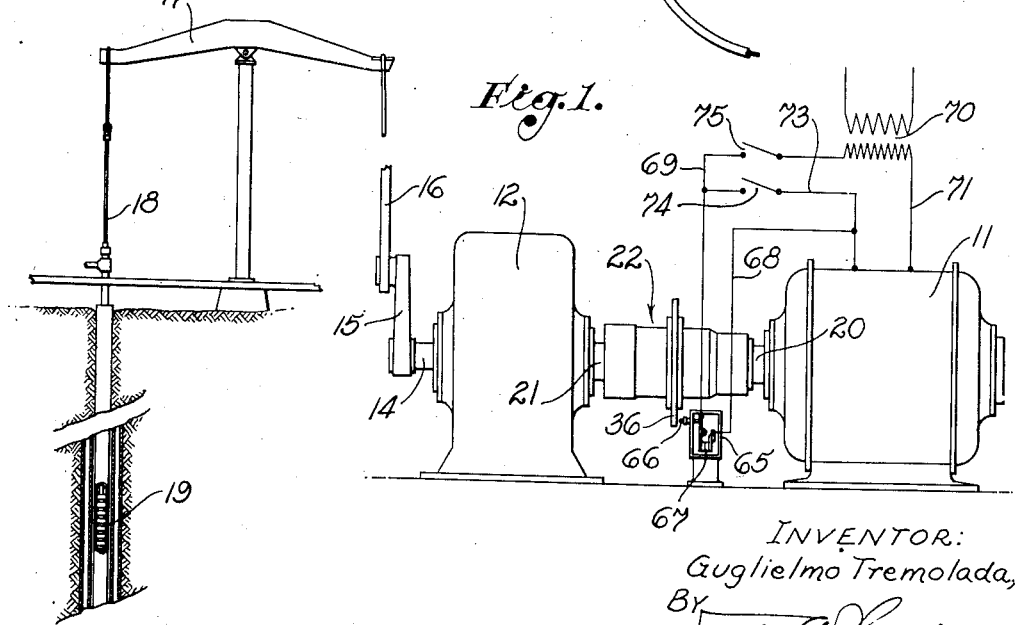
INVENTOR:
Guglielmo Tremolada,
By
ATTORNEY.

April 2, 1935.  G. TREMOLADA  1,996,311
COMBINATION FLEXIBLE COUPLING AND TORQUE CONTROL
Filed Feb. 3, 1933  3 Sheets-Sheet 2
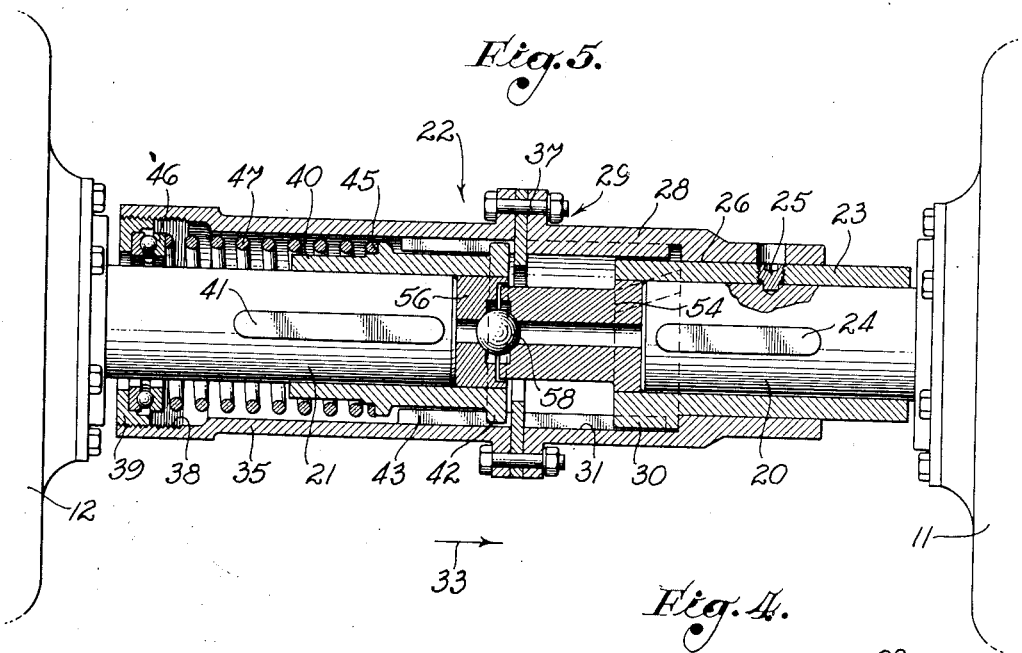
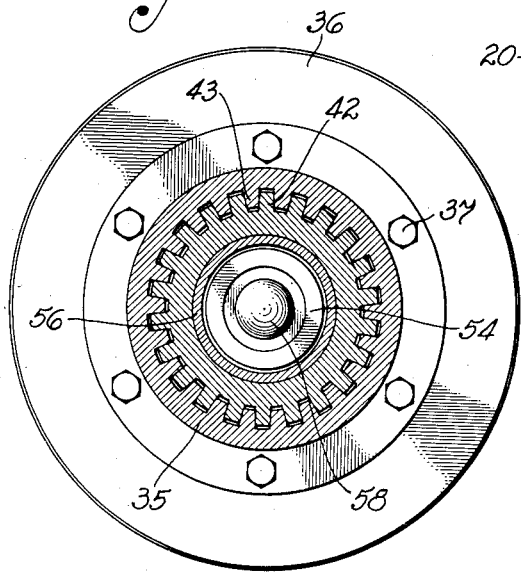
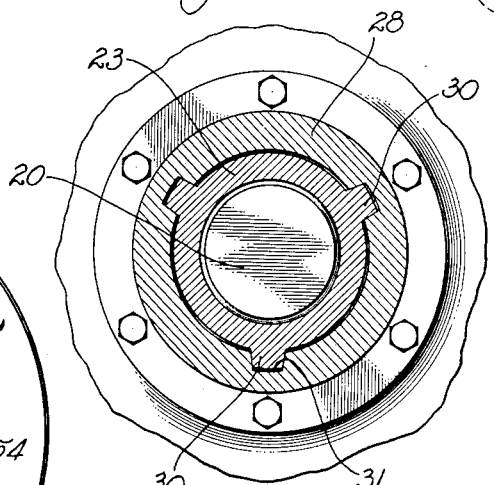
INVENTOR:
Guglielmo Tremolada,
BY
ATTORNEY.

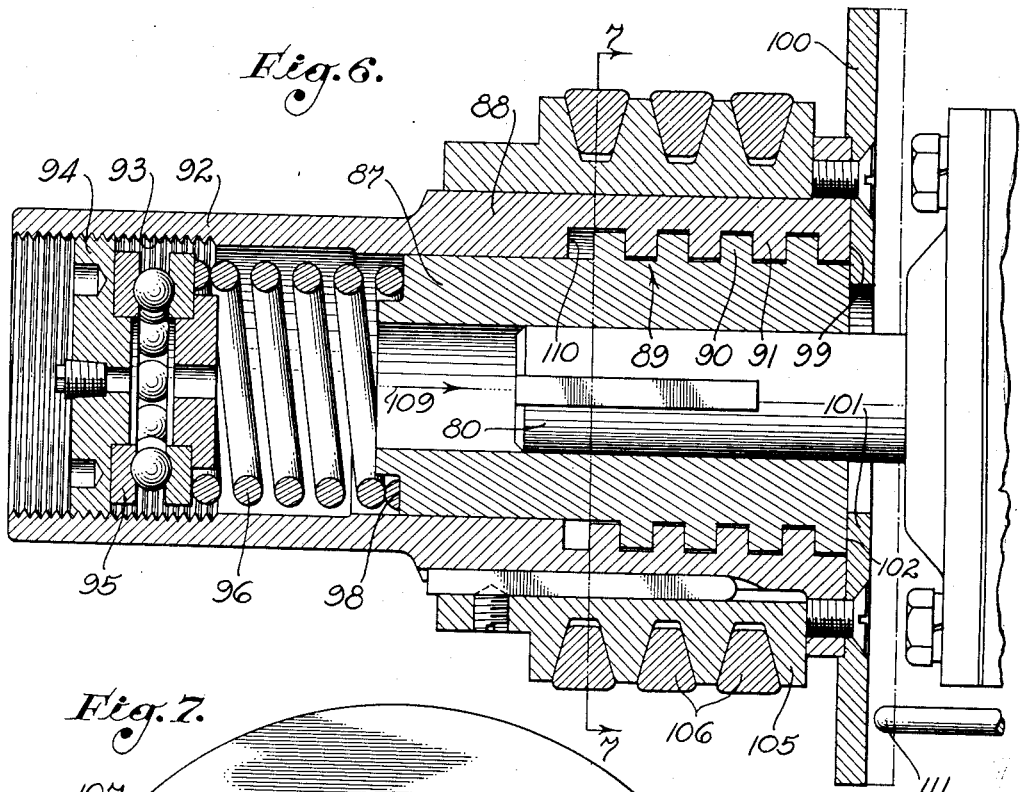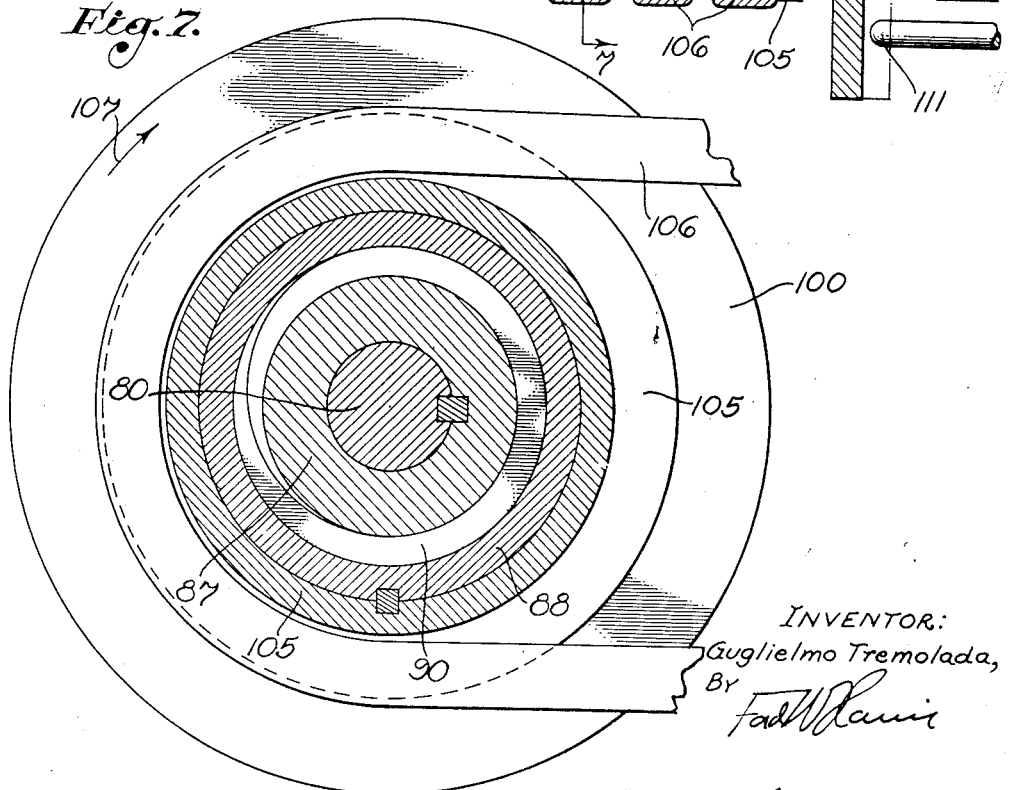

Patented Apr. 2, 1935

1,996,311

UNITED STATES PATENT OFFICE 1,996,311

COMBINATION FLEXIBLE COUPLING AND TORQUE CONTROL

Guglielmo Tremolada, Los Angeles, Calif., assignor to Emsco Derrick & Equipment Company, Los Angeles, Calif., a corporation of California Application February 3, 1933, Serial No. 655,037

11 Claims. (Cl. 192—150)

My invention consists in a device for use in power transmitting means and between drive and driven devices. My invention in its entirety includes a control device which controls the torque which can be transmitted from the drive to the driven device, which includes flexible coupling features in order that the same be adapted for connecting together a drive and a driven shaft, and includes shock absorbing features in order that when starting the apparatus or when placing a load on the driven device of the apparatus this device of my invention will relieve the shock by absorbing the torque until such a time that the drive and driven devices are operated at synchronous speeds. It will be understood, however, that these various parts of my invention may be separately used as desired and therefore my invention comprehends a device which acts as a torque control, or a device which constitutes a flexible coupling, or a device which constitutes a shock absorber. I believe my invention not only to be broadly new in its entirety, but believe the various elements and subcombinations of the invention in its entirety are new and therefore seek patent protection on the invention in its entirety and in its several cooperating parts.

My invention has a particular utility in operating oil well pumps in the oil producing industry, and in view of this fact I will describe that embodiment of my invention which I have designed particularly for this use. It should be strictly understood, however, that my invention may be employed in the various arts and industries where control apparatus of the general type of my invention has a utility, and it should likewise be understood that I do not wish to limit my invention to the oil producing industry. I am describing this particular embodiment of my invention merely for the purpose of instructing those skilled in the art as to how my invention may be practiced.

In order that the features of my invention may be more readily understood, I will make brief reference to that portion of the oil producing industry to which my invention appertains. For the purpose of this explanation I will refer to the type of pumping apparatus which employs a walking-beam located in the derrick of the well, which walking-beam is connected to a string of sucker rods which extends downwardly into the well and is secured to a pump plunger at its lower end. Such a walking-beam is ordinarily connected by means of a pitman to a crank whereby the walking-beam is oscillated. It has been found highly desirable and economical to operate the pump relatively slowly and with a relatively long stroke, and it is the practice at the present time to employ a reduction gear drive means which permits the use of a prime mover of a relatively low horsepower. The type of reduction apparatus which may be employed with considerable success in the practice of my invention is the Falk speed reducer, such as the 5DA type manufactured by The Falk Corporation, Milwaukee, Wisconsin. The speed reduction unit, to which I refer as the driven device or the driven means in the ensuing part of my application, may be operated by a small motor or gas engine of relatively low horsepower, which apparatus performs highly satisfactorily so long as operating conditions of the apparatus remain at, or nearly at, normal. Whenever an abnormal condition exists, the drive means, which may be the motor or gas engine, may be unduly taxed and injury thereto may result; or the driven means may be injured by being operated while some abnormal condition prevails; for example, there may be a breakage of a part, there may be a freezing of a bearing, there may be slippage of belt drives, or the oil pump operated thereby may be sanded up. When the term "abnormal condition" is referred to, it is meant that some condition is brought to pass in the apparatus which increases the driving torque necessary to operate the apparatus, and thus produces greater strain on the drive means.

It is an object of my invention to provide means which automatically shuts down the drive means or prime mover when the torque required to operate the driven means becomes abnormal.

Another object of my invention is to provide a torque control means which moves into a predetermined position when the torque becomes abnormal. When such means moves into a predetermined position, it may, as will be fully described hereinafter, operate the apparatus whereby the drive means is deenergized.

A still further object of my invention is to so design the torque control means that, during the starting of the apparatus when the starting torque is in effect, which starting torque is considerably greater than the normal operating torque, it will permit the drive means to operate the driven means during a starting of the apparatus without the apparatus shutting off. In other words, when such apparatus is started it is necessary to transmit from the drive means to the driven means an excessive torque until the driven means has been brought to normal operating speed and the torque reduced to normal operating torque.

In the preferred form of my invention I accomplish this result by providing the device of my invention with a positive driving means which comes into operation when an excessive or large amount of torque is applied through the device of my invention.

A still further object of my invention is to provide a torque control means in which the parts return to normal position when the torque becomes normal.

My invention may be embodied in various types of power transmitting connections between drive and driven means. For example, the invention may be embodied in chain drives, belt drives, gear drives, or may be embodied in the form of a coupling between two substantially aligned shafts.

It is a further object of my present invention to provide a flexible coupling adapted to be connected between a pair of shafts and to compensate for any disalignment of the two shafts.

At the instant a drive means is set into operation, there is considerable shock imposed upon the parts of the driven means and the transmitting devices connected between the drive and driven means if the parts are rigidly connected together.

It is an object of my present invention to provide a shock absorbing means which may be incorporated in the power transmitting device located between the drive and driven means, which will absorb the shocks and thus reduce the strains placed on the mechanism.

In the preferred form of my invention I provide a structure in which one part rotates relative to the other and in which the torque is gradually transmitted from the drive means to the driven means and the driven means gradually brought up to normal speed. When the driven means is driven at normal speed, the torque required to drive same naturally reduces and as this reduction in driving torque occurs, the parts constituting my invention gradually return to normal positions to occupy these normal positions until an abnormal torque condition occurs.

My invention, as previously pointed out, may embody one or more of the objects which have been outlined heretofore. My invention in its preferred form includes each and every object but, as will be seen from the foregoing explanation of the objects of my invention, these various objects may be independently used if the features of my invention in their entirety are not desired. This point is rather important and should be kept in mind when considering the scope and nature of my invention.

I will now refer to the drawings in which my invention is illustrated and will describe various forms of my invention in detail. During the course of this description, various important features and advantages of the invention will be brought out.

In the accompanying drawings,

Fig. 1 is a diagrammatic view illustrating the utility of one form of my invention, certain portions of the apparatus being shifted from their normal relative position in this view to effect simplicity of illustration.

Fig. 2 is a section of the form of my invention whose utility is disclosed in Fig. 1.

Figs. 3 and 4 are sections taken as indicated by the lines 3—3 and 4—4 of Fig. 2.

Fig. 5 is a sectional view similar to Fig. 2 but showing the form of my invention which is designed primarily for use as a shock absorber.

Fig. 6 is a section through a device of my invention which is designed for use where a belt or chain drive is employed.

Fig. 7 is a section taken on the line 7—7 of Fig. 6.

I will now refer to Figs. 1 to 4 inclusive and describe the details of construction of the first form of my invention.

As shown in Fig. 1, the numeral 11 represents a drive means which may be any type of prime mover or driving mechanism. The numeral 12 represents a driven means which may be any type of apparatus which is driven by a drive means for any useful purpose. In the illustration in Fig. 1, the drive means 11 is an electric motor and the driven means 12 is a Falk speed reducer of the 5DA type manufactured by The Falk Corporation, Milwaukee, Wisconsin. The speed reducer has a shaft 14 to which a crank 15 is connected. This crank 15 is in turn connected to the lower end of a pitman 16. The pitman 16 reciprocates a walking-beam 17 and the walking-beam 17 reciprocates a string of sucker rods 18 which is connected thereto. Connected to the lower end of the string of sucker rods 18 is a pump plunger 19 which is finally reciprocated to pump oil to the surface of the ground. The drive means has a drive shaft 20 which constitutes a part of a drive element, and the speed reducer 12 has a driven shaft 21 which constitutes a part of a driven element. Connected to these drive and driven shafts 20 and 21 is a control device 22 which incorporates the features of my invention. Reference will now be had to Figs. 2 to 4 inclusive in order that the details of construction of this form of my invention may be understood. The drive shaft 20 is provided with a sleeve 23 which is rigidly secured thereto by use of a suitable key 24 and by use of a setscrew 25. This sleeve 23 has an outer cylindrical surface 26, as shown. Adapted to be supported thereon is a section member 28 of a coupling member 29 which constitutes a part of the coupling means of my invention. The coupling member 29 is therefore, rotatably, as well as slidably, supported by the cylindrical surface 26 of the sleeve 23 and is, therefore, rotatably, as well as slidably, supported relative to the drive shaft 20. The leftward end of the sleeve 23 is provided with a series of splines 30 which are arranged at an angle to the axis of rotation A—A of the parts. These splines 30 are adapted to extend into slots or keyways 31 provided in the leftward end of the section 28. These slots 31 are slightly larger than the splines 30 and are angled so as to conveniently receive these splines 30. The splines 30 and the slots 31 cooperate to provide a cam means or a means whereby the coupling member 29 is moved in a rightward direction or is moved in a direction indicated by the arrow 33 when a relative rotation occurs between the drive shaft 20 and the coupling member 29. The drive shaft 20 is driven in a direction indicated by the arrow 34 of Fig. 2 and it will, therefore, be seen that there is at all times a tendency for the splines 30 to engage the walls of the slots 31 and to produce a reactionary force which tends at all times to move the coupling member 29 in the direction indicated by the arrow 33.

Secured to the section 28 is a section 35 which is in alignment therewith. Positioned between the sections 28 and 35 is a thrust plate 36, there being bolts 37 for securing these parts together. The section 35 of the coupling member 29 surrounds the driven shaft 21 and is internally threaded at 38 so as to adjustably support a nut 39. Mounted on the driven shaft 21, either rigidly or adjustably, is a collar 40. There is, however, a key 41 which prevents relative rotation between these parts even though one part might be slidable relative to the other. The collar has on the rightward end thereof a series of teeth or blades 42 which are arranged in cylindrical order as disclosed best in Fig. 3. The interior of the section 35 is provided with inwardly extending blades or teeth 43, and these blades or teeth 42 and 43 coengage with each other in order that there may be a driving engagement between the coupling member 29 and the driven shaft 21. The blades 42 and 43 are disposed at angles relative to the axis A—A, but it will be noticed that they are angled oppositely to the splines 30 and the slots 31. The blades 42 and 43 are so disposed that when the coupling member 29 drives the collar 40 a reactionary force is produced which tends to force the coupling member in the direction of the arrow 33. This is done in order to reduce any friction which might restrain the collar member from moving in a rightward direction in response to the reactionary force produced by the splines 30 and the walls of the slots 31 when a certain amount of driving torque is transmitted.

The collar 40 is provided with a shoulder 45, and compressed between the shoulder 45 and a bearing 46 which engages the nut 39 is a compression spring 47. This compression spring exerts a force which at all times tends to maintain the coupling member 29 in the position in which it is shown in full lines in Fig. 2. When torque is transmitted through the apparatus there is a tendency for the spring to compress and when the torque transmitted thereto increases above a certain amount, the coupling member 29 will move in the direction of the arrow 33.

The thrust plate 36 has an inwardly extending flange 49 which is adapted to engage a shoulder 50 provided by the end of the sleeve 23 when the coupling member has moved in the direction of the arrow 33 a predetermined distance and when the parts have moved into a position indicated by dotted lines 51 of Fig. 2. When the parts have moved into these positions there is a positive driving engagement between the drive and driven shafts 20 and 21. This is a feature which enables the drive means to drive the driven means with an excessive starting torque until such time that the driven means is operating at normal speeds and until such times as the torque reduces to normal. The parts remain in dotted line position until the torque returns to normal at which time the parts return to normal position, as shown by full lines in Fig. 2.

In view of the fact that it is exceedingly difficult, if not impossible, to establish and maintain a true axial alignment of the shafts 20 and 21 along the axis A—A, I find it highly desirable to incorporate as a part of my invention a flexible coupling feature which compensates for any angular disalignment. This portion of my invention I will now describe.

Supported by the end of the shaft 20 or by the sleeve 23 is a block 54 having a seat 55 of spherical character. Supported by the shaft 21 or by the collar 40 is a second block 56 which has a spherical seat 57. These spherical seats are arranged concentric to the axis of each of the shafts 20 and 21. Placed between the blocks 54 and 56 is an aligning member or bearing member in the form of a ball 58 which is adapted to engage the spherical seats 55 and 57. The parts are adjusted so that there is a close running fit between the bearing 53 and the spherical seats, and this construction which constitutes an aligning means of my invention holds the adjacent ends of the shafts 20 and 21 in alignment. If either of the shafts is not positioned with its axis along the axis A—A, there may be a relative swinging action produced when the parts rotate. This action is referred to as a pivotal movement as distinguished from a rotational movement such as occurs between certain parts in the apparatus, and the element 21 may be said to be pivotally supported relative to the coupling means. In view of the fact that the coupling member 29 is slidably and rotatably supported by the sleeve 23, any swinging action which occurs must take place between the coupling member 29 and the shaft 21 or the parts associated therewith. Therefore, if there is any disalignment between the shafts 20 and 21 a swinging action will occur around the center of the ball 58 with the result that the blades 42 may swing back and forth, as indicated by the arrow 60. It will be noted that a line passing vertically through the center of the ball 58 bisects the blades 42 so that the arc of swinging of the blades 42 is bisected by this line which extends through the center of the ball 58 which may be indicated as B—B in Fig. 2. The inward and outward movement of the blades 42 is therefore reduced to a minimum with the result that clearances between the various parts may also be reduced to a minimum.

Referring again to Fig. 1, it will be noted that a control means in the form of a switch box 65 is suitably supported adjacent the thrust plate 36. This switch box 65 has an engageable means or push button 66 which is engaged by the thrust plate 36 just prior to the time that the flange 49 engages the shoulder 50. When the thrust plate engages the button 66 and depresses same, a control switch 67 is opened. This control switch 67, as shown in Fig. 1 is connected to a wire 68 which extends to the motor 11, and to a wire 69 which extends to a transformer or other source of energy 70. A wire 71 is extended from the transformer 70 to the motor 11. When the switch 67 is opened, the motor 11 is deenergized. For the purpose of enabling the apparatus to be started, at which time it is well understood there is a driving torque which is higher than the normal operating torque, I provide a shunt circuit which includes a wire 73 which shorts out the switch 67. This wire 73 includes a switch 74 which when closed completes the shunt in the circuit around the switch 67. The wire 69 includes a main starting switch 75 which must be closed in order to supply electrical energy to the motor 11. By closing the switch 75 and the switch 74, current is supplied to the motor 11 and the fact that the switch 67 may be opened will not disconnect the electrical circuit. When the device has been brought up to normal speed, the switch 67 will be closed and the switch 74 may thereafter be opened. If an abnormal condition should occur and abnormal torque be transmitted through the control device 22, the coupling member 29 and the thrust plate 36 will move in a rightward direction, and the thrust plate will engage the button 66, thus opening the switch 67 and shutting down the motor 11.

In order that the operation of this form of my invention may be fully understood, I will now describe in full the operation which takes place during the starting, running and stopping of the apparatus. When it is desired to start the apparatus it is necessary to energize the motor 11. This is done by first closing the switch 74 and thereafter closing the switch 75, both of which are shown in Fig. 1. This supplies electrical energy to the motor 11 and causes same to operate. The rotation is transmitted through the drive shaft 20, the control device 22 and through the driven shaft 21 to the driven means 12 which is the speed reducer, and any other part which may be desirable. As is well known, the starting torque of an apparatus is considerably higher than normal operating torque, and therefore the reactionary force produced by the splines 30 and the walls of the slots 31 cause the coupling member 29 to move in the direction of the arrow 33 until the flange 49 engages the shoulder 50. At this time there is a positive driving engagement between the parts, and the driven means will be driven, notwithstanding that an excessive torque must be transmitted through the device of my invention. It will, of course, be understood that when the parts are in this position, which is shown by dotted lines 51 in Fig. 2, the button 66 has been depressed and the switch 67 has been opened. This, however, does not disturb the supplying of electrical energy to the motor 11 due to the fact that the shunt circuit 73 is closed by the switch 74. When the parts are operating at normal speeds, the torque gradually reduces to a normal torque, and the spring 47 which has been compressed during the transmission of the excessive torque gradually removes the coupling member 29, as shown by full lines in the drawings in Fig. 1. This will move the thrust plate 36 from contact with the button 66 and the switch 67 will be closed. At this time the operator may open the switch 74 which opens the shunt circuit 73, and electrical energy which energizes the motor 11 must be supplied through the switch 67.

As long as operating conditions remain normal, the device will continue to operate until the operator desires to shut same down. This may be done by opening the main switch 75. If at any time during the operation of the apparatus something occurs which increases the driving torque, the coupling member 29 will commence to move in a rightward direction as indicated by the arrow 33 of Fig. 2. If this torque increases to such an extent that some damage may occur, this being predetermined and being taken into consideration when the adjustable nut 39, which controls the compression of the compression spring 47, is adjusted, the coupling member 29 will move sufficiently in the direction of the arrow 33 to cause the thrust plate 36 to engage and depress the button 66. This will open the switch 67 and thus deenergize the motor 11. In this manner any injury to the motor or other parts will be prevented, since excessive torque which must be transmitted if the driven means is to be operated under abnormal conditions will automatically move the parts in order to deenergize the motor.

During the starting of the apparatus and when the switches 74 and 75 are closed, if there were a rigid connection between the drive means and the driven means, considerable shock might be transmitted. By use of my invention, however, this shock is eliminated due to the fact that the compression spring 47 will yield and thus absorb the shock instead of transmitting it through the apparatus to the driven means.

If any disalignment exists or occurs between the shafts 20 and 21, the driven shaft 21 is free to swing around the center of the ball 58, as previously pointed out, and this swinging action merely causes the blades 42 to swing back and forth, as indicated by the arrow 60 in Fig. 2. Although not shown in the drawings, enough clearance will be left between the blades 42 and 43 to allow free longitudinal movement between these parts.

This form of my invention incorporates all of the features thereof and is the preferred form of my invention which is to be used when all of the advantages are desired and when it is to be used between a drive and a driven shaft which must be coupled together, as disclosed in Figs. 1 and 2.

As I have explained heretofore, it is not necessary to employ each and every feature of my invention. For example, in Fig. 5 I have shown a form of my invention which incorporates only the flexible coupling features and shock absorbing features. The form of my invention disclosed in Fig. 5 is essentially a shock absorber and the flexible coupling features therefore may be fully eliminated if desired. It will be noted that various parts shown in Fig. 5 are equivalent to the parts shown in Fig. 2 except that they are elongated in order that the coupling 29 may have a longer travel and the spring may compress to a larger extent. This form of my invention may be very useful in rolling mills where a considerable strain is brought to pass when a piece of material to be rolled is placed in the rolling mill, which may be the driven means of the combination. In view of the fact that the parts shown in Fig. 5 are equivalent to the parts shown in Figs. 2 to 4 inclusive, similar numerals are employed on the corresponding parts. It will be seen from an inspection of Fig. 5 that when a shock is imposed which creates an excessive torque, the coupling member 29 will move in the direction of the arrow 33 of this figure, thus absorbing the shock and not transmitting same to the drive device, and vice versa, if shock or sudden force is produced in the drive means, it is not transmitted to the driven means but is absorbed by the long compression spring 47.

In Figs. 6 and 7 I disclose a form of my invention which is included in Figs. 1 to 4 inclusive, but which is adapted for use on chain or belt drives rather than on the direct connection drive, as disclosed in Figs. 1 to 4 inclusive. In this form of my invention shown in Figs. 6 and 7, the numeral 80 represents a shaft which extends outwardly from the housing of the driven means which may be any type of apparatus as pointed out in connection with the form of my invention shown in Figs. 1 to 4 inclusive. This shaft 80 is equivalent to the driven shaft 21 shown in Fig. 2. In this form of my invention there is secured to the end of the shaft 80 a torque-responsive means or control device which includes the features of my invention. Rigidly secured to the shaft 80 is an inner sleeve 87 which supports an outer sleeve or body 88. This outer sleeve 88 is journaled on the inner sleeve 87, and cooperating between these parts is a cam means or connecting means which is generally designated by the numeral 89. The cam means in this type of my invention is provided in the form of square threads 90 which extend outwardly from the inner sleeve 87 and are interengaged with square threads 91 formed on the inner part of the body 88, the square threads 90 fitting in helical channels provided between the square threads 91 and the square threads 91 fitting between helical channels provided between the square threads 90. Formed as a part of the body or sleeve 88 is a cylindrical projection 92 which projects outwardly beyond the inner sleeve 87 and which is internally threaded at 93. Threadedly supported in the end of this extension 92 is a shoulder in the form of an adjustment member or adjustment nut 94, which by rotation relative to the extension 92 may be adjusted into different positions therein. This nut 94 constitutes but one form of adjustable shoulder which may be employed in my invention. Placed within this nut 94 is a bearing 95 which is engaged by the outer end of a compression spring 96. The inner end of this compression spring 96 engages an end shoulder 98 of the inner sleeve 87. The purpose of the spring 96 is to retain the parts in the positions disclosed in Fig. 6. Secured to the inner face 99 of the body 88 is a friction plate 100. This friction plate 100 has an inner annular portion 101 which projects inwardly a sufficient distance to engage the inner face 102 of the sleeve 87, in order to act as a stop against which the spring 96 pulls the friction plate 100.

Rigidly secured to the body 88 is a pulley member 105 around which a belt means or equivalent 106 is extended for driving the control means of my invention in a direction indicated by the arrow 107 of Fig. 7. The threads 90 and 91 are formed so that a rotation of the body 88 relative to the sleeve 87 in a direction indicated by the arrow 107 will advance the body 88 in a direction indicated by the arrow 109 of Fig. 6. However, under normal operating conditions such a movement of these parts does not occur because the spring 96 resists relative movement between the parts 87 and 88. The adjustable nut 94 is adjusted so that a certain amount of torque may be transmitted from the body 88 to the sleeve 87. When the torque required to drive the body 88 exceeds this predetermined value, the body 88 will rotate relative to the sleeve 87 and the body 88 will move in a direction indicated by the arrow 109 until it has moved a sufficient distance for the end of the thread 90 to engage a suitable shoulder 110, at which time the body 88 has a positive driving engagement with the sleeve 87. Under operating conditions the apparatus will shut down before this positive drive is established, this occurring by reason of the thrust plate 100 engaging a shut-off button 111; but during the starting of the apparatus this positive drive may be utilized as pointed out in connection with the form of my invention disclosed in Figs. 1 to 4 inclusive, and may be operated by the circuit disclosed diagrammatically in Fig. 1.

In this form of my invention the flexible coupling feature is not utilized since it is not necessary. The drive shaft is not in alignment with the driven shaft, but is spaced therefrom and may be connected thereto by belts, chains or gears as desired. The shock absorbing features are utilized due to the presence of the compression springs 96.

From the foregoing description of the three forms of my invention it is quite apparent that the principle of my invention may be embodied in various structural forms. I therefore do not wish to be limited to the details of construction disclosed in the drawings of this application and described in the specification, but wish my invention to be broadly construed in accordance with the advance which I have made in the art and in accordance with the appended claims.

I claim as my invention:

1. In a device of the class described, the combination of: a drive element; a driven element; coupling means by means of which a driving engagement is established between said elements; means whereby a relative rotational movement between one of said elements and said coupling means causes an axial movement of said coupling means; and means whereby one of said elements is pivotally supported relative to said coupling means.

2. In a device of the class described, the combination of: a drive element; a driven element; coupling means by means of which a driving engagement is established between said elements; means whereby a relative rotational movement between one of said elements and said coupling means causes an axial movement of said coupling means; positive drive means whereby a positive driving relationship is established between said elements when a predetermined rotational movement between said coupling means and the said element has occurred; and means whereby one of said elements is pivotally supported relative to said coupling means.

3. In a device of the class described, the combination of: a drive element; a driven element; coupling means by means of which a driving engagement is established between said elements; means whereby a relative rotational movement between one of said elements and said coupling means causes an axial movement of said coupling means; means for determining the amount of torque which is transmitted through said elements before relative rotation occurs; and means whereby one of said elements is pivotally supported relative to said coupling means.

4. In a device of the class described, the combination of: a drive element; a driven element; coupling means by means of which a driving engagement is established between said elements; means whereby a relative rotational movement between one of said elements and said coupling means causes an axial movement of said coupling means; means for determining the amount of torque which is transmitted through said elements before relative rotation occurs; positive drive means whereby a positive driving relationship is established between said elements when a predetermined rotational movement between said coupling means and the said element has occurred; and means whereby one of said elements is pivotally supported relative to said coupling means.

5. In a device of the class described, the combination of: a drive element; a driven element in substantial alignment therewith; coupling means through which said drive element drives said driven element; connecting means for drivably connecting said coupling means to said drive element and to said driven element; said connecting means producing an axial movement of said coupling means when a relative rotational movement between said coupling means and one of said elements occurs; and pivotal means connecting the other of said elements to said coupling means.

6. In a device of the class described, the combination of: a drive shaft; a driven shaft substantially in alignment therewith; a coupling member slidably and rotatably mounted on one of said shafts; means for producing axial movement of said coupling member when same rotates relative to said shaft on which said coupling member is rotatable; means drivably connecting the other of said shafts and said coupling member; and means for yieldingly resisting relative movement between said coupling member and said shaft on which same is slidably and rotatably mounted.

7. In a device of the class described, the combination of: a drive shaft; a driven shaft substantially in alignment therewith; a coupling member slidably and rotatably mounted on one of said shafts; means for producing axial movement of said coupling member when same rotates relative to said shaft on which said coupling member is rotatable; means drivably connecting the other of said shafts and said coupling member; means for yieldingly resisting relative movement between said coupling member and said shaft on which same is slidably and rotatably mounted; and aligning means for retaining the ends of said shafts substantially in axial alignment.

8. In a device of the class described, the combination of: a drive shaft; a driven shaft substantially in alignment therewith; a coupling member slidably and rotatably mounted on one of said shafts; means for producing axial movement of said coupling member when same rotates relative to said shaft on which said coupling member is rotatable; means drivably connecting the other of said shafts and said coupling member; means for yieldingly resisting relative movement between said coupling member and said shaft on which same is slidably and rotatably mounted; and positive drive means whereby a positive driving connection between said coupling member and said shafts is established when a predetermined movement has occurred between said coupling member and one of said shafts.

9. In a device of the class described, the combination of: a drive shaft; a driven shaft substantially in alignment therewith; a coupling member slidably and rotatably mounted on one of said shafts; means for producing axial movement of said coupling member when same rotates relative to said shaft on which said coupling member is rotatable; means drivably connecting the other of said shafts and said coupling member; means for yieldingly resisting relative movement between said coupling member and said shaft on which same is slidably and rotatably mounted; aligning means for retaining the ends of said shafts substantially in axial alignment; and positive drive means whereby a positive driving connection between said coupling member and said shafts is established when a predetermined movement has occurred between said coupling member and one of said shafts.

10. In a device of the class described, the combination of: a drive shaft; a driven shaft substantially in alignment therewith; a coupling member slidably and rotatably mounted on one of said shafts; means for producing axial movement of said coupling member when same rotates relative to said shaft on which said coupling member is rotatable; means drivably connecting the other of said shafts and said coupling member; and means operable between said coupling member and one of said shafts for yieldingly resisting relative movement between said coupling member and said shaft on which same is slidably and rotatably mounted.

11. In a device of the class described, the combination of: a drive shaft; a driven shaft substantially in alignment therewith; a coupling member slidably and rotatably mounted on one of said shafts; means for producing axial movement of said coupling member when same rotates relative to said shaft on which said coupling member is rotatable; means drivably connecting the other of said shafts and said coupling member; means operable between said coupling member and one of said shafts for yieldingly resisting relative movement between said coupling member and said shaft on which same is slidably and rotatably mounted; aligning means for retaining the ends of said shaft substantially in axial alignment; and positive drive means whereby a positive driving connection between said coupling member and said shafts is established when a predetermined movement has occurred between said coupling member and one of said shafts.

GUGLIELMO TREMOLADA.